July 14, 1959
W. H. ZINN
2,894,892
NEUTRONIC REACTOR CHARGING AND DISCHARGING
Filed May 15, 1951
3 Sheets-Sheet 2
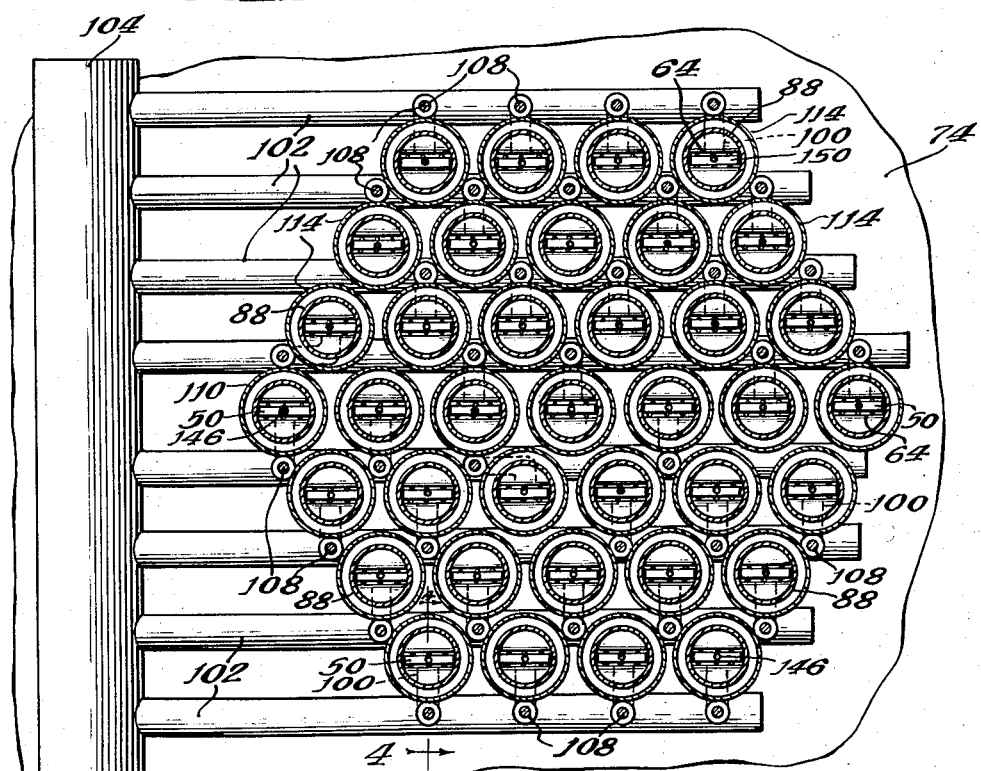
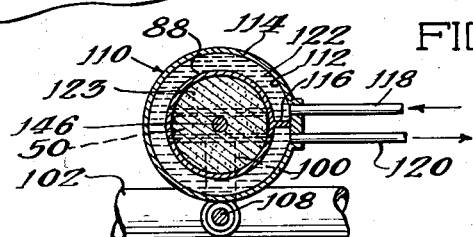
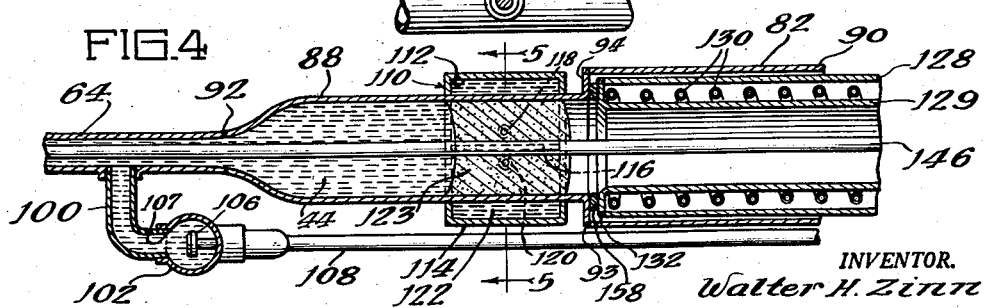
INVENTOR.
Walter H. Zinn
BY
Roland A. Anderson
Attorney

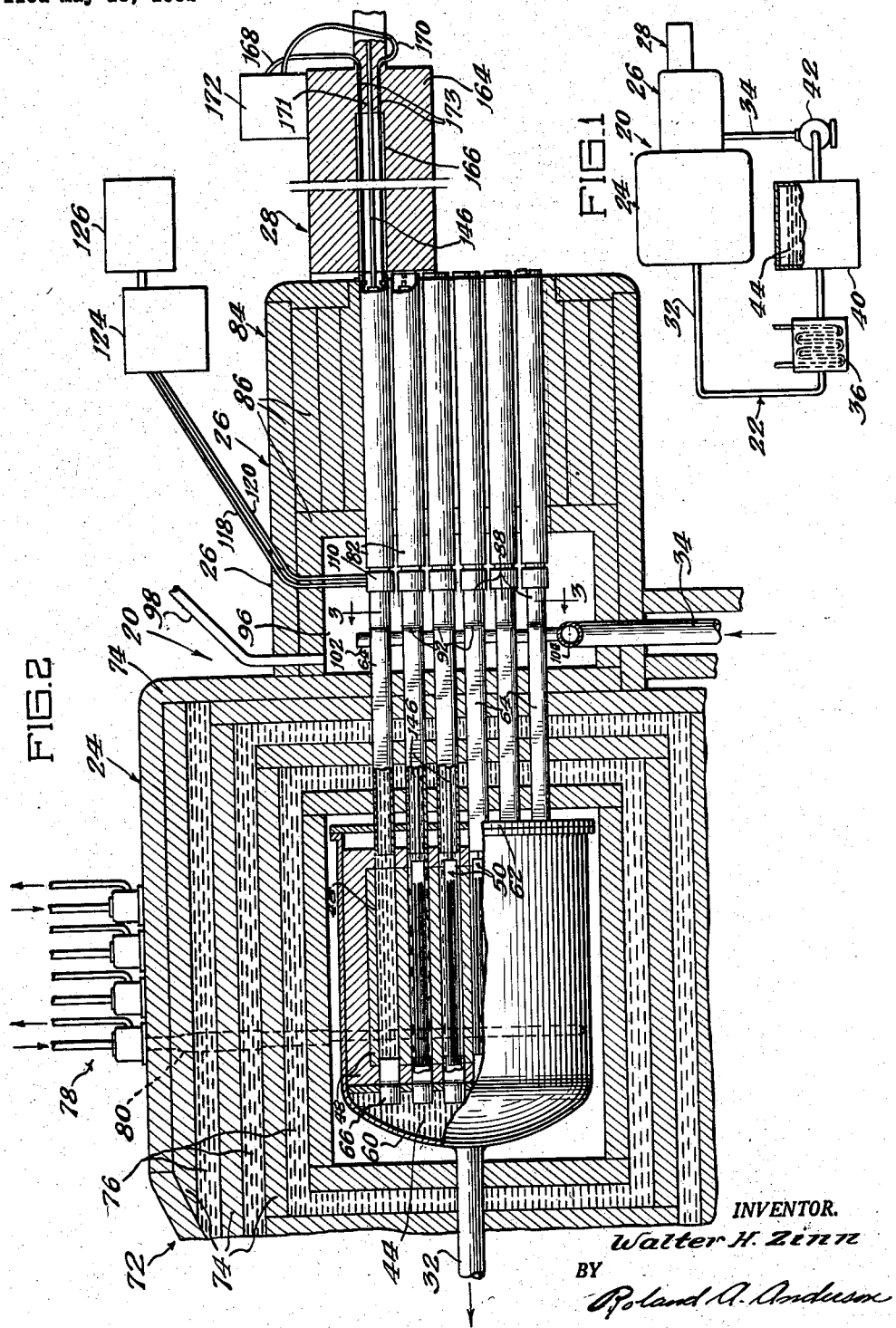

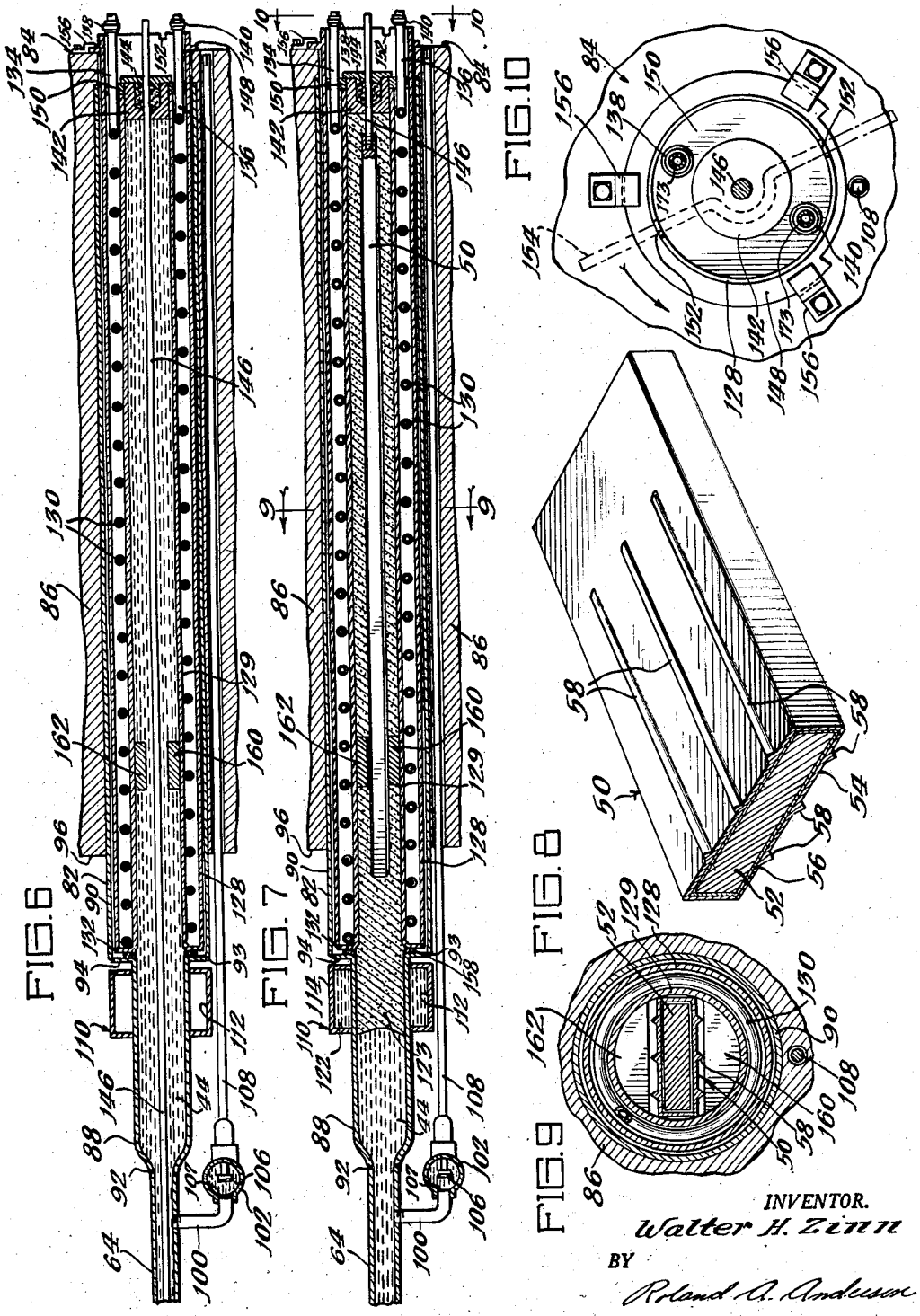

2,894,892

NEUTRONIC REACTOR CHARGING AND DISCHARGING

Walter H. Zinn, Hinsdale, Ill., assignor to the United States of America as represented by the United States Atomic Energy Commission Application May 15, 1951, Serial No. 226,341

9 Claims. (Cl. 204—193.2)

This invention relates, generally, to a neutronic reactor cooled by a circulating liquid and more particularly to a neutronic reactor wherein fissionable material about which a coolant liquid circulates can be unloaded and reloaded with the assurance that coolant fluid will not spill or leak into the region adjacent to the reactor.

A fission chain reaction is achieved in a structure usually referred to as a "pile" or neutronic reactor in a common type of which a plurality of bodies containing fissionable material are geometrically disposed in a neutron slowing material termed the moderator. In one type of such structure, the bodies of fissionable material are arranged in parallel process tubes that extend through the moderator from one side to the other. Since the fission process is an exothermic reaction, the heat generated by the nuclear activity must be dissipated in order to maintain a predetermined temperature level of operation. This is usually accomplished by annexing a closed cooling system to the reactor whereby a cooling liquid is flowed through a heat exchanger from which it moves to a reservoir where it is stored for recirculation through the tubes. Hence, the coolant flows about a closed system acquiring heat from the reactor and yielding it to the exchanger.

Inasmuch as the present invention is not concerned with the details of design and operation of a reactor, reference is herein made to the Fermi et al. Patent 2,708,656, dated May 17, 1955, in which detailed information is set forth regarding the considerations of design and operation of a reactor.

In a neutronic reactor employing liquid sodium or a liquid alloy of sodium and potassium metals as the coolant circulating in the cooling system, the problem of unloading and reloading the bodies of fissionable material from and into the reactor presents a difficulty. The facts that the coolant is radioactive and that such a metal or alloy readily burns in an atmosphere containing oxygen require that no spills or leaks occur to endanger equipment or personnel. It has been found in accordance with the present invention that complete isolation of the interior from the exterior may be accomplished by using refrigeration as a valve or freeze lock for sealing the coolant within the system in such a manner that a spill or leak is completely avoided. The incorporation of the freeze lock greatly facilitates the unloading and reloading of a process tube of the reactor over the methods used heretofore, and insures that there will be no dripping of any kind.

Among the other advantages inherent in the use of the present invention are the ease of operation and the lack of moving parts. Other advantages will appear upon reading of the description of the invention illustrated in the drawings, in which:

Figure 1 is a schematic view of a neutronic reactor and a closed cooling system attached thereto;

Figure 2 is a horizontal sectional view of a neutronic reactor;

Figure 3 is a vertical sectional view through a portion of the reactor showing the geometric disposition of the process tubes, taken on the line 3—3 of Figure 2;

Figure 4 is an enlarged fragmentary vertical sectional view through one of the tubes shown in Figure 3, taken on the line 4—4 of Figure 3, showing a portion only of said tube and of an isolation chamber together with a freeze lock;

Figure 5 is a transverse sectional view of the freeze lock taken on the line 5—5 of Figure 4;

Figure 6 is an enlarged vertical sectional view of the freeze lock and the empty isolation chamber, showing the manner in which the coolant medium is disposed therein in the liquid state;

Figure 7 is an enlarged vertical sectional view of the freeze lock and the isolation chamber having a body of fissionable material disposed within the cooling medium;

Figure 8 is a perspective view, partially in section, of a portion of a fissionable body;

Figure 9 is an enlarged transverse sectional view of the isolation chamber and the fissionable body taken on the line 9—9 of Figure 7; and Figure 10 is an enlarged elevational view of the discharge end of the isolation chamber taken on the line 10—10 of Figure 7.

Referring now to Figure 1 a neutronic reactor is generally indicated at 20 together with a closed cooling system generally indicated at 22. The reactor 20 comprises an active portion 24 and a discharge portion 26. At the end of the discharge portion 26 remote from the active portion 24 is disposed a discharge coffin or receptacle generally indicated at 28.

The cooling system 22 comprises a coolant outlet 32 and a coolant inlet 34, a heat exchanger 36, a coolant reservoir 40, and a coolant pump 42. By virtue of the closed cooling system 22 attached to the reactor 20, a cooling medium or liquid 44 absorbs heat within the reactor and yields it to the heat exchanger 36, from which the liquid moves to the reservoir 40 and then returns to the reactor 20.

Considering Figure 2, the reactor 20 is shown in greater detail. In the principal or active portion 24, there are formed a plurality of horizontal process chambers 46 within a moderator 48, which is an element of low atomic weight, such as carbon or beryllium. In particular this embodiment of the neutronic reactor employs a moderator composed of beryllium bricks closely fitted together. The bricks are milled to form the elongated process chambers 46 when the bricks are laid together. In this manner the horizontal process chambers 46 extend from one end of the moderator 48 to the other. The cross-section of each chamber 46 is rectangular. In this manner each chamber accommodates an elongated rectangular body or "slug," as it is sometimes called, of fissionable material 50. Each body 50 extends throughout one chamber 46 within the limits of the moderator 48.

The body 50 has a core 52 of a fissionable isotope, such as $U^{235}$ or Pu, suitably diluted with inert, moderator, or absorber materials. As shown in Figure 8, the core 52 is completely encased within a surrounding jacket 54 of suitable material such as stainless steel. A heat-conducting bond 56 of sodium-potassium alloy is disposed between the fissionable material 52 and the jacket 54. The bond 56 is liquid and must fill all available space between the fissionable material 52 and the jacket 54. As the operating temperature of the reactor increases, however, provision for the expansion of this bond must be made. This is done by making the steel jacket 54 thin enough so that it will bow sufficiently to give the increased volume required. In order to permit flow of coolant past the fuel element 50, the overall dimensions of the rectangular cross-section of the body 50 are slightly less than the cross-section of the process chambers 46, and the body is held in position by longitudinal ribs 58 formed on the top and bottom surfaces of the body 50 as shown in Figure 8. The advantage of the use of rectangular or flat bodies 50 is that at high temperatures appreciable expansion will occur within the jacket 54 which will be accommodated by bulging of said jacket. A body having a round cross-section will not accommodate any bulging but will rupture the jacket because its volume is at a maximum with respect to the enclosing surface area.

Entirely surrounding the beryllium block moderator 48, which is cylindrical in structure, is a cylindrical tank 60 that is fabricated of a suitable material such as steel. The end of the tank 60 nearest the loading portion 26 is covered by a flat plate 62 which is perforated to accommodate a plurality of rectangular tubes 64 which communicate with the horizontal process chambers 46 and which will be described more fully hereinafter. The end of the tank 60 remote from the loading portion 26 is convex and houses the end section of the principal or active portion 24 into which extend nozzles 66 from each chamber 46. The nozzles 66 have a cross-section slightly less than that of the chambers 46 and are constructed of a suitable material such as stainless steel sheet. In turn, said end section of the tank 60 communicates with the coolent outlet 32 which was described hereinabove with reference to Figure 1.

Surrounding the cylindrical tank 60 is a laminated shield generally indicated at 72 that consists of layers of steel members 74 and of a hydrocarbon 76, such as oil. Extending through one side of the reactor 20 are a number of control rods generally indicated at 78 that consist of a movable elongated member 80 passing through the laminated shield 72 and into the center of the principal or active portion 24 between certain of the process chambers 46 as shown by the dotted outline. Each member 80 is made of a neutron absorbing material, such as boron, and is designed to be cooled by an inert gas, such as helium, which circulates into and out of said control rods as shown by the arrows.

The loading portion 26 comprises a number of isolation chambers 82 equal to the number of process chambers 46, and a shielded housing generally indicated at 84 surrounding said chambers, consisting of a number of steel shield members 86. Each isolation chamber 82 constitutes an extension of an elongated channel which begins at the convex end of the steel tank 60 with the nozzles 66 and which includes the respective horizontal process chamber 46, the rectangular tube 64 connected with said chamber, a cylindrical pipe 88 connected to the tube 64 (see Figures 4, 6 and 7), and a circular casing 90. The tube 64 extends through the laminated shield 72 (Figure 2) to a weld 92 where the cross section of the channel enlarges like a funnel, from that of rectangle to a circle which is constituted by the pipe 88. As shown in Figures 3, 6 and 7, the pipe 88 extends to the larger circular casing 90 at which point there is a shoulder 94 where the pipe is welded at 93 to said casing.

Upon emerging from the laminated shield 72 the tubes 64 extend through a compartment 96 which is formed by the shield members 86 of the housing 84 adjacent the outer steel member 74 of the laminated shield 72. This compartment 96 is filled with inert gas through a conduit 98, thereby insuring the existence of an non-oxidizing atmosphere around the portion of the tubes 64 and the pipes 88 which are enclosed within said compartment. Within the compartment 96 an inlet port 100 for the cooling liquid 44 is provided for each tube 64. As shown in Figure 3, said inlets communicate with a secondary header 102 leading from a primary header 104 that, in turn, is connected to the coolant inlet 34 which was described hereinabove with reference to Figure 1. As shown in Figure 4, a valve head 106 is provided to control the volume of cooling liquid 44 entering each port 100. Each valve head 106 may be manipulated to and from a valve seat 107 by an elongated rod 108 extending from said valve head to the outer face of the structure, where it is accessible to operating personnel. The cooling liquid 44 fills the pipe 88 wherein it is confined relatively stagnant (closure of the outer end of the tube 88 being effected in a manner to be described). The coolant flows through tube 64 to the chamber 46 in the active portion 24 of the reactor 20, whence it flows through the nozzles 66 to the coolant outlet 32.

On the pipe 88 between the inlet port 100 and the isolation chamber 82 is disposed a freeze lock 110. As shown more particularly in Figures 4 and 5, the freeze lock 110 comprises an annular chamber 112 between the pipe 88 and a housing 114 attached thereto in a fluid-tight manner. At one side of the chamber 112 a partition 116 is disposed between a refrigerant inlet 118 and a refrigerant outlet 120. A refrigerant fluid 122 passes through the inlet 118, circulates around the pipe 88 within the chamber 112, and leaves said chamber via the outlet 120 as shown by the arrows in Figure 5. As shown in Figure 2, the inlet 118 and the outlet 120 extend to a refrigeration unit 124 operated by an electric motor 126. Due to the possibility of leaks of cooling liquid 44 from the valve seat 107 and of refrigerant fluid 122, the freeze locks 110 are located in the compartment 96 which is filled with an inert gas, as above stated.

As shown in Figure 2, the isolation chambers 82 extend throughout the length of the shielded housing 84 to the end remote from the reactor 20. Each isolation chamber 82 comprises (Figures 4, 6, 7) the circular casing 90, an elongated sleeve or tube 128, and a refrigeration coil 130 within said sleeve. The exterior surface of the casing 90 is completely surrounded by the shield member 86 except for that end within the compartment 96. The sleeve 128 is slidably disposed within the casing 90. Concentrically disposed within the sleeve 128 is an inner sleeve 129 that is flared at one end and welded at 132 to the sleeve 128. As shown in Figures 6, 7 and 9 a refrigeration coil 130, disposed between the sleeves 128 and 129, is provided with an inlet port 134 and an outlet port 136 that extend from the end of said coil remote from the shoulder 94. Each port 134 and 136 is provided with a union 138 and 140, respectively. A plug 142 is secured to the end of the inner sleeve 129 in order to effect closure thereof. The plug 142 is apertured centrally and is provided with packing 144 to accommodate an elongated shaft 146 slidably disposed therein, one end of which is attached to the body 50 of fissionable material (Figure 7). In addition to sealing the inner sleeve 129 the plug 142 is provided with an annular flange 150 having a diameter equal to the inner diameter of the sleeve 128. Said flange is apertured at two points to accommodate the ports 134 and 136 of the refrigeration coil 130 as shown in Figure 10. It is to be pointed out that the end of the annular portion of the sleeve 128 extends beyond the end of the inner sleeve 129 and also beyond the face of the shielded housing 84. In addition this end is provided with two notches 152 oppositely disposed which are adapted to accommodate a twist bar 154, the purpose of which will be described hereinafter. Further, three lock members 156 are equidistantly disposed about the periphery of the sleeve 128 and attached to the face of the shield housing 84 by detachable means, such as bolts. The members 156 are secured against an annular flange 148 integral with the sleeve 128 and are adapted to arrest any longitudinal movement of the sleeve 129 from the shoulder 94 at which point is provided an annular gasket 158 of a suitable material, such as aluminum to provide a seal against the cooling liquid 44 between the pipe 88 and said sleeve. Within the sleeve 129 are disposed two oppositely disposed support members 160 and 162 that support the body 50 of fissionable material when it is lodged therein.

The cask or receptacle 28 (Figure 2) constitutes a housing made of material of high atomic weight, such as lead, with an elongated chamber 166 centrally disposed along the longitudinal axis thereof and closed at the outer end. The dimensions of said chamber are comparable both in diameter and length to those of the casing 90 forming the isolation chamber 82. Being designed as a cartridge receptacle for handling irradiated material, the cask 28 is adapted for end-to-end abutment separately with the plurality of isolation chambers 82 in order to receive the sleeve 128 containing a body 50 from the casing 90 (in a manner to be described). A pair of flexible refrigeration conduits 168 and 170 extend through the chamber 166 and are adapted to be attached to the unions 138 and 140, respectively, of the refrigeration coil 130. Since the end of the chamber 166 remote from the reactor 20 is closed, three apertures are provided, an aperture 171 centrally thereof for the elongated shaft 146, and two apertures 173 on either side thereof for the conduits 168 and 170, through which said parts are slidably disposed. The conduits 168 and 170 lead to a refrigeration unit 172 which is attached to the cask 28.

Operation

The device illustrated permits unloading and replacing bodies or slugs 50 of fissionable material without exposing the cooling liquid 44 to the atmosphere, thereby safeguarding operating personnel from fire hazards and exposure to radioactivity. Under normal operating conditions, with the body 50 disposed within the several horizontal process chambers 46, as shown in Figure 2, the cooling liquid 44 circulates through said chambers and over the surfaces of said bodies at a high flow rate. During this time the refrigerant fluid 122 is circulated about the annular chamber 112 of the freeze lock 110, serving to maintain a frozen mass 123 of coolant 44 which effectively plugs the pipe 88 (Figure 4). At certain intervals of operation it becomes necessary to replace the bodies or slugs 50 with fresh supplies of fissionable material. At such times the frozen plug of cooling medium 44 is permitted to melt by the simple expedient of shutting off the circulation of the refrigerant fluid 122. The condition shown in Figure 6 then prevails, the cooling liquid 44 filling the pipe 88 in addition to the inner sleeve 129 of the isolation chamber 82. At the same time the rate of flow of the cooling medium 44 is regulated to a minimum necessary to carry off the heat generated by induced radioactivity. The body 50 to be replaced is pulled from the horizontal process chamber 46 by means of the elongated shaft 146 through the tube 64 and the pipe 88 to the inner sleeve 129, as shown in Figure 7. The cask 28 is then aligned with the isolation chamber 82 and moved longitudinally towards it, the shaft 146 being slidably disposed through the aperture 171 in the end of said cask remote from the isolation chamber 82. However, before the cask 28 is tightly secured against the end of the chamber 82, the refrigeration conduits 168 and 170 are attached to the ports 134 and 136, respectively, of the refrigeration coil 130 by means of the unions 138 and 140. The refrigeration units 124 and 172 are then activated to freeze the cooling liquid 44 within the freeze lock 110 and within the inner sleeve 129. In this manner the frozen mass 123 of cooling medium 44 extends from the freeze lock 110 to the remote end of the inner sleeve 129. This ensures no leakage or spilling of cooling liquid 44 when the sleeve 128 is withdrawn from the casing 82 into the cask 28. Before the withdrawal can be accomplished, however, it is necessary to fracture the frozen mass 123 of cooling medium 44 by twisting the sleeve 128 within the casing 82. This is accomplished by detaching the lock members 156 and inserting the twist bar 154 into the oppositely disposed notches 152 in the end of said sleeve. The force required to execute such a twist may be applied by an overhead crane (not illustrated) attached to the twist bar 154. The frozen alloy of sodium and potassium severs with a clean fracture near the shoulder 94 of the isolation chamber 82. The sleeve 128 is then withdrawn from the casing 90 into the cask 28 by further retraction of the shaft 146. The cask 28 is then removed to another location where it is safe to melt the cooling liquid 44 and to remove the body 50 of fissionable material.

Loading a fresh body 50 of fissionable material into the reactor 20 is the reverse of the removal of the spent body 50 as was set forth above. The cask 28 is returned to its former position of abutment with the open end of the casing 90 and the annular sleeve 128 is pushed into said casing until the annular gasket 158 on the forward end of the sleeve abuts the shoulder 94. The lock members 156 are then fixed in place and the refrigeration unit 124 is turned off in order to permit the frozen cooling liquid 44 to melt in the freeze lock 110. The pipe 88 is then clear for the insertion of the fresh body 50 of fissionable material to be thrust by means of the elongated shaft 146 into the horizontal process chamber 46 at the center of the reactor 20. The refrigeration unit 124 is again turned on to freeze the cooling liquid 44 at the freeze lock. After this the pumping pressure and flow rate of the cooling fluid 44 circulating through the particular process chamber 46 are readjusted to normal by means of the valve 106.

It will be understood that the above-described apparatus embodying the invention is merely by way of illustration and not limitation, inasmuch as various and other forms of the invention will be readily apparent to those skilled in the art without departing from the spirit of the invention or the scope of the appended claims.

What is claimed is:
1. A method of removing a body of fissionable material from a neutronic reactor through a closed isolation chamber connected thereto while blocking the escape of substantial amounts of cooling fluid comprising the steps of withdrawing the body into the chamber, freezing the fluid at the end of the chamber adjacent the reactor, opening the chamber, and removing the body.

2. A method of removing a body of fissionable material from a process tube in a neutronic reactor into a closed isolation chamber connected thereto while blocking the escape of substantial amounts of cooling liquid comprising the steps of withdrawing the body from the tube into the chamber, freezing the liquid at the end of the tube adjacent the chamber, opening the chamber at the end remote from the tube, and removing the body.

3. A neutronic reactor comprising an active portion having a plurality of process tubes, each tube having an open end adapted to accommodate bodies to be processed therein, a cooling liquid in the tubes, a liquid inlet near the open end, a liquid outlet near the other end, means for circulating the liquid through the tubes, a refrigeration unit around a segment of the tubes between the open end and the inlet, said unit being adapted to freeze the cooling liquid within the segment thereof an isolation chamber attached to the open end of each tube extending longitudinally therefrom and adapted to contain at least one body of fissionable material, and a second refrigeration unit around the chamber.

4. A neutronic reactor comprising an active portion having a plurality of process tubes, said tubes having an open end adapted to accommodate bodies to be processed therein, a cooling liquid in the tubes, a liquid inlet near one end of the tube, a liquid outlet near the other end, means for circulating the liquid through the tubes, a refrigeration unit around a segment of the tubes adjacent the open end, said unit being adapted to freeze the cooling liquid within the segment thereof, an isolation chamber attached to the open end of each tube extending longitudinally therefrom and adapted to contain at least one body of fissionable material, a second refrigeration unit around the chamber, and means for moving bodies between the tube and the chamber.

5. A neutronic reactor comprising an active portion having a plurality of horizontal process tubes, said tubes having an open end beyond the limit of the active portion adapted to accommodate bodies of fissionable material, a cooling liquid in the tubes, a liquid inlet near the open end, a liquid outlet near the other end, means for circulating the liquid through the tubes, a refrigeration unit around a segment of each tube between the open end and the inlet, said unit being adapted to freeze the cooling liquid within the segment of the tube, an isolation chamber attached to said open end of each tube extending longitudinally therefrom and adapted to contain at least one body of fissionable material, and means for moving said bodies between the tubes and the chamber.

6. A neutronic reactor comprising an active portion, a plurality of horizontal process tubes extending through said portion, said tubes having an open end adapted to accommodate bodies of fissionable material, a cooling liquid in each tube, a liquid inlet near the open end, a liquid outlet near the other end, means for circulating the liquid through the tubes and over the surfaces of said bodies, a first refrigeration unit around a segment of each tube between the open end and the inlet, an isolation chamber attached to the open end of each tube extending longitudinally therefrom, said chambers being adapted to receive bodies of fissionable material, means for moving said bodies between the tubes and the chamber, and a second refrigeration unit around the isolation chamber, said refrigeration units being operable to freeze the cooling liquid.

7. A neutronic reactor comprising an active portion having a plurality of horizontal process tubes, each tube having an open end adapted to accommodate bodies of fissionable material, a cooling liquid in each tube, a liquid inlet near one end of each tube, a liquid outlet near the other end, means for circulating the liquid through the tubes, a refrigeration coil around a segment of the tube adjacent the open end and adapted to freeze the cooling liquid within the segment, an isolation chamber attached to the open end of each tube extending longitudinally therefrom, and a shaft slidably disposed through the chamber, one end of the shaft being attachable to the body in each tube and being adapted to move said body between the tube and the chamber, said refrigeration coil being operable to freeze the cooling liquid.

8. A neutronic reactor comprising an active portion, a plurality of process tubes extending through said portion, said tubes having an open end adapted to accommodate bodies of fissionable material, a cooling liquid in the tube adapted to circulate therethrough and over the surfaces of said bodies, a liquid inlet near the open end of each tube, a liquid outlet near the other end, a first refrigeration unit around a segment of each tube between the open end and the inlet, an isolation chamber attached to the open end of each tube extending longitudinally therefrom, said chamber being adapted to receive bodies of fissionable material, means for moving said bodies between the tube and the chamber, and a second refrigeration unit around the isolation chamber, said refrigeration units being operable to freeze the cooling liquid.

9. A neutronic reactor comprising an active portion, a plurality of horizontal process tubes extending through said portion, each tube having an open end adapted to accommodate bodies of fissionable material, a cooling liquid in each tube, a liquid inlet near the open end of each tube, a liquid outlet at the other end, means for circulating the liquid through the tube, a first refrigeration coil around a segment of each tube between the open end and the inlet, an isolation chamber attached to the open end of each tube extending longitudinally therefrom, said chamber having a detachable inner portion communicative with said open end, the inner portion being adapted to receive bodies of fissionable material, the end of said portion remote from the chamber being closed and having an aperture disposed centrally thereof, said chamber also having a second refrigeration coil around the inner portion, and a shaft slidably disposed in the aperture in a fluid-tight manner and extendable through the chamber into the tube, one end of the shaft being attachable to the body in each tube and being adapted to move said body between the tube and the chamber, said refrigeration coils being operable to freeze the cooling liquid.

References Cited in the file of this patent

UNITED STATES PATENTS

| | | |
|---|---|---|
| 2,257,727 | Bennett | Oct. 7, 1941 |
| 2,572,555 | Young et al. | Oct. 23, 1951 |

OTHER REFERENCES

Smyth: "A General Account of the Development of Methods of Using Atomic Energy for Military Purposes Under the Auspices of the United States Government," 1940–1945, pp. 83 and 84. For sale by Supt. of Doc., Washington 25, D.C.